June 23, 1936.  K. L. KELLER  2,044,884

MOWING AND SPRAYING APPARATUS

Filed Dec. 24, 1934

INVENTOR

Kirk L. Keller,

BY

ATTORNEYS

Patented June 23, 1936

2,044,884

UNITED STATES PATENT OFFICE 2,044,884

MOWING AND SPRAYING APPARATUS

Kirk L. Keller, Creve Coeur, Mo., assignor to The Moto-Mower Co., Detroit, Mich., a corporation of Michigan Application December 24, 1934, Serial No. 758,979

6 Claims. (Cl. 56—26)

This invention relates to a combination power lawn mower and spraying apparatus and has for its object to adapt the mower and the apparatus each to the other in such manner that the resultant mechanism will be capable of fully performing the functions of each.

In carrying my invention into practice I provide or employ a lawn mower comprising wheels, a cutting reel, a motor for driving the wheels and the reel, and a platform for supporting a motor above the reel. A particular object of this invention is to make this motor platform of such size and shape that it will be adaptable to the mounting of the spraying apparatus thereon, and to form or erect suitable brackets and saddles thereon for integral or permanent attachment thereto, the saddles and brackets being adaptable to demountably receive the spraying apparatus.

Another object is to provide a suitable driving means from the motor to the pump of the apparatus and to so control the drive that the pump may work simultaneously with the main supporting wheels of the mower or independently thereof and independently of the cutting reel.

Other objects and advantages including the nicety of arrangement will become hereinafter more fully apparent as reference is had to the accompanying drawing wherein my invention is illustrated by way of example and in which—

Figure 2:
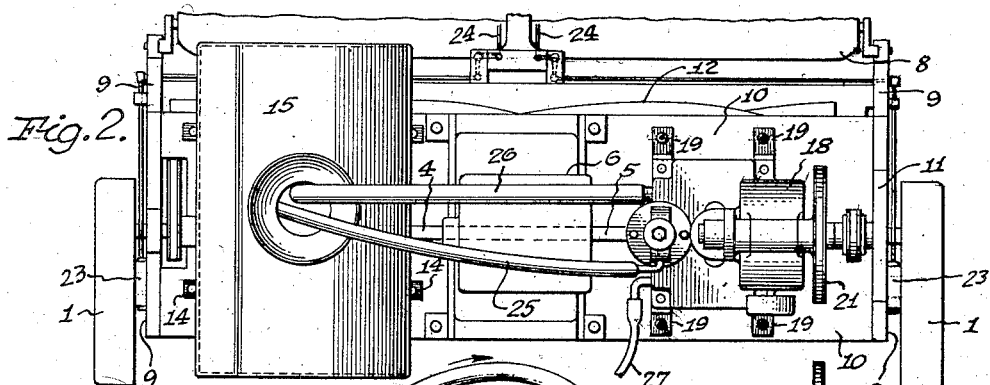
Fig. 2 is a top plan view of the mechanism shown in Fig. 1.
Figure 1:
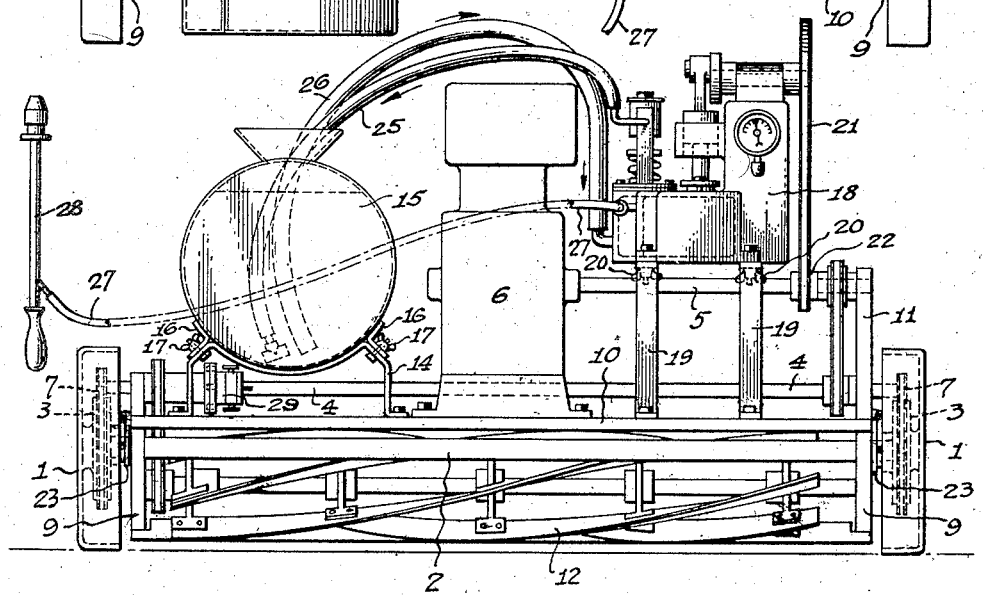
Figure 1 is a front elevation of my improved mower and spraying apparatus.
Figure 3:
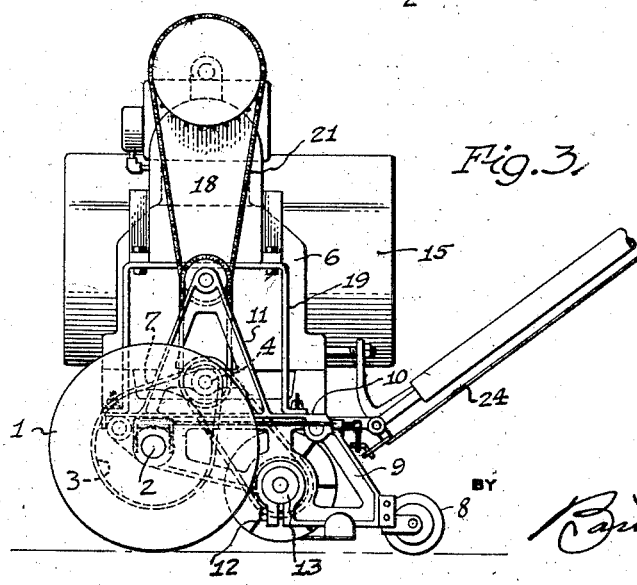
Fig. 3 is a side elevation thereof.

More particularly, 1 indicates the traction and supporting wheels having the common axle shaft 2. Integrally secured to the wheels 1 are driving gears or pulleys 3 driven from a jackshaft 4 which is driven by a power shaft 5 from a motor 6. Belts or chains 7 from the jackshaft 4 drive the gears or pulleys 3.

Supported by the two main wheels 1 and one or more smaller wheels 8 is a frame 9 including a motor platform 10 and an integral bracket 11. A cutting reel 12 is journalled at 13 in the lower part of the frame and the bracket 11 constitutes a support for the outer end of the drive-shaft 5. The motor 6 is secured to the platform 10 in such manner as to distribute its weight between the wheels 1 and 8, and the spraying apparatus, to be now described, which is adapted for dismounting when desired, is mounted on the platform 10 in two separate units, one on each side of the motor 6 in order to likewise distribute its weight.

The platform 10, being of sufficient size and shape for the purpose, has a saddle or brackets 14 permanently secured thereto to receive a tank 15 adapted to contain a spraying liquid. This tank has ears or lugs 16 integrally secured thereto, and finger operable wing nuts and bolts 17 secure these lugs to the saddle 14. On the opposite side of the motor a pumping unit 18 is mounted on the platform 10 by means of the brackets 19. The pumping unit 18 is also secured in place by wing nuts 20, the brackets 19 being of such shape and height that the pump may be driven from the power shaft 5 through a belt or chain 21 and a gear or pulley 22.

A clutch 23 at each wheel 1 is actuable by a pull rod 24 for purposes of steering and stopping the vehicle while the motor is running. A clutch is also provided at 29 for disengaging the operation of the cutting reel 12. If desired, a clutch may be embodied in the pulley 22 also, although I have found that this is not necessary.

The spraying apparatus itself may be of conventional type wherein one pipe 25 serves as a fluid conduit for agitating the liquid in the tank, another conduit 26 passes the liquid from the tank through the pump and into a feed line 27, and a nozzle 28 fed by the line 27 is used to play the stream. As shown, the pipe 25 is a conduit for liquid from the relief valve of the pump.

What I claim is:

1. An attachment for a power lawn mower including wheels, a frame and a motor for driving said wheels; said attachment comprising a platform and a liquid spraying apparatus comprising a tank for liquid to be sprayed and a pumping unit connected to said tank, said motor and apparatus being mounted on said platform, and means for driving said pumping unit from said motor.

2. A spray device for application to a power lawn mower comprising wheels, a frame supported by said wheels and a motor for driving said wheels supported by said frame substantially centrally between said wheels whereby its weight is distributed between said wheels; said spray device including a platform on said frame, a pumping apparatus mounted on said platform, said apparatus comprising two units one of which is mounted at one side of said motor and the other at the other side thereof whereby the weight of said apparatus is also distributed between said wheels, and means for driving said apparatus by said motor.

3. An attachment for a power lawn mower including wheels, and a motor; said attachment comprising a supporting platform supported by said wheels and a motor for driving said wheels mounted on said platform, said platform having brackets permanently secured thereto, a spraying apparatus demountably attached to said brackets, and means for operating said spraying apparatus from said motor.

4. An attachment for a power lawn mower including wheels, a motor supported by said wheels in driving relation thereto; said attachment comprising a platform, a saddle integrally secured to said platform on one side of said motor, a tank for liquid to be sprayed mounted in said saddle, a pumping unit mounted on said platform at the other side of said motor, and means for driving said pumping unit from said motor.

5. A spray device for attaching to a power lawn mower including wheels, a motor supported by said wheels in driving relation to said wheels; said device comprising a platform, a saddle permanently attached to said platform at one side of said motor, a tank for liquid having integral lugs detachably secured to said saddle, a pumping unit detachably mounted on said platform at the other side of said motor, means for driving said pumping unit from said motor, and means for engaging and disengaging said wheels and said motor independently of the driving connection of said motor and said pumping unit.

6. A spraying attachment for a power mower having wheels, a frame bridging said wheels, a cutting reel journalled in said frame, and a motor mounted on said frame for selectively driving said wheels and said reel; said attachment comprising a container for liquid mounted on said frame at one side of said motor, a pumping unit at the other side of said motor, said pumping unit including a source of fluid supply for agitating the liquid in said container and conduit means for feeding said liquid through a nozzle, and means for driving said unit by said motor simultaneously with and also independently of the drive of said wheels by said motor.

KIRK L. KELLER.